United States Patent
McKeown et al.

(10) Patent No.: US 7,617,721 B2
(45) Date of Patent: Nov. 17, 2009

(54) APPARATUS AND METHODS FOR DETERMINING A PREDICTED VEHICLE BRAKING OPERATION

(75) Inventors: Stephen Lyle McKeown, Campbellford (CA); Daniel Andrew Faux, Trenton (CA); Paul Edward Cudmore, Castleton (CA)

(73) Assignee: 3rd Millennium Solutions, Ltd., Campbellford, Ontario (CA)

( * ) Notice: Subject to any disclaimer, the term of this patent is extended or adjusted under 35 U.S.C. 154(b) by 111 days.

(21) Appl. No.: 11/866,074

(22) Filed: Oct. 2, 2007

(65) Prior Publication Data

US 2008/0236268 A1    Oct. 2, 2008

Related U.S. Application Data

(60) Provisional application No. 60/848,534, filed on Oct. 2, 2006.

(51) Int. Cl.
*G01M 17/00* (2006.01)
(52) U.S. Cl. ....................................... 73/128
(58) Field of Classification Search ............ 73/121, 73/128, 129, 130
See application file for complete search history.

(56) References Cited

U.S. PATENT DOCUMENTS

| | | | |
|---|---|---|---|
| 3,893,330 | A | 7/1975 | Shute et al. |
| 4,098,111 | A | 7/1978 | Hardmark et al. |
| 4,144,748 | A | 3/1979 | Vinogradov et al. |
| 4,212,063 | A | 7/1980 | Hardmark |
| 4,662,211 | A | 5/1987 | Strong |
| 4,779,447 | A | 10/1988 | Rath |
| 4,958,512 | A | 9/1990 | Johnsen |
| 5,056,354 | A | 10/1991 | Kuwana et al. |
| 5,331,839 | A | 7/1994 | Schmidt |
| 5,814,718 | A | 9/1998 | Andresen et al. |
| 6,276,189 | B1 | 8/2001 | Hurson |
| 6,427,519 | B2 | 8/2002 | Ueda et al. |
| 6,463,784 | B2 | 10/2002 | Kashiwagi et al. |
| 6,525,671 | B1 | 2/2003 | Vannan |
| 6,711,935 | B2 | 3/2004 | Hurson |
| 6,928,857 | B1 | 8/2005 | Brown |
| 7,286,909 | B2 * | 10/2007 | Darke ........................... 701/3 |
| 2002/0124629 | A1 | 9/2002 | Hurson |

FOREIGN PATENT DOCUMENTS

GB    2369606 A    5/2002

OTHER PUBLICATIONS

Supplemental European Search Report dated Dec. 29, 2008, 10 pgs., App. No. EP08101265.
Partial European Search Report dated Aug. 14, 2008, 5 pgs., App. No. EP08101265.

\* cited by examiner

*Primary Examiner*—Eric S McCall
(74) *Attorney, Agent, or Firm*—Pearne & Gordon LLP

(57) ABSTRACT

Apparatus for determining a predicted vehicle braking operation is provided. The apparatus includes a test tire, a brake associated with the test tire, and an actuator operably connected to the test tire and configured to selectively apply a representative vehicle force to the test tire. The apparatus further includes a controller operably connected to the brake and configured to apply a representative vehicle braking algorithm to the brake. The apparatus also includes a sensor associated with the test tire and configured to provide feedback for determining a predicted vehicle braking operation. Aspects of the invention further include methods of using the apparatus.

22 Claims, 7 Drawing Sheets

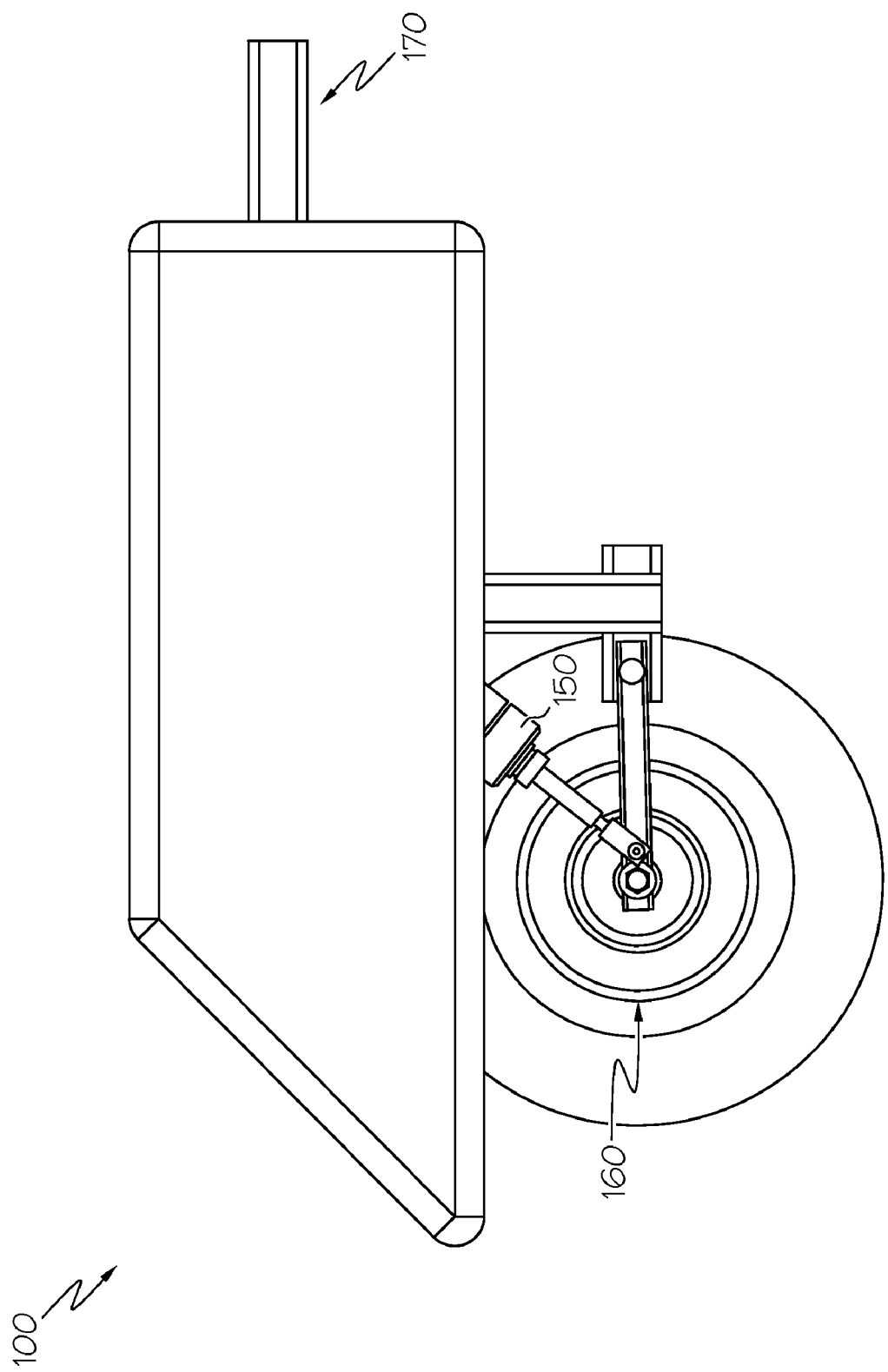

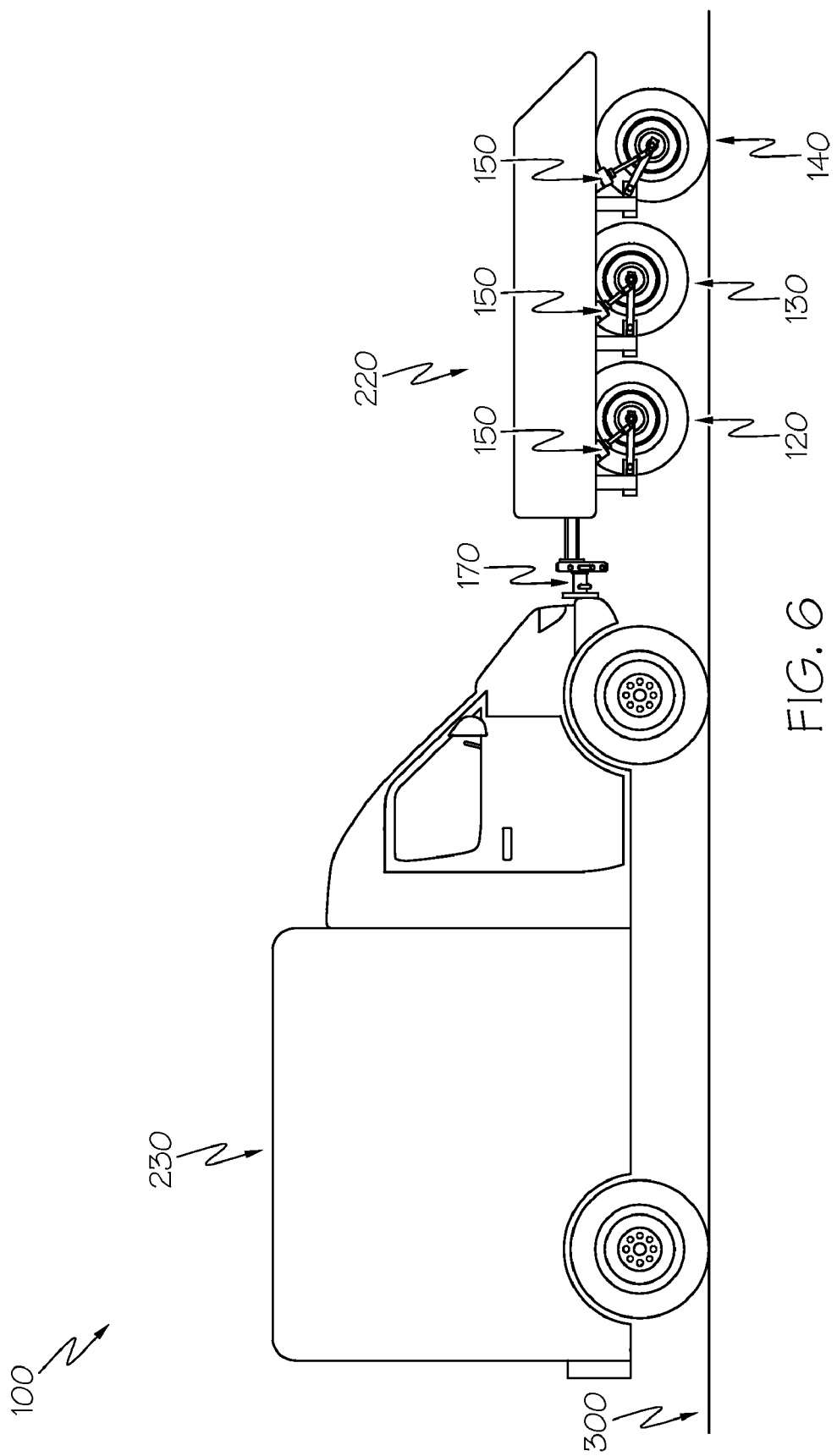

APPARATUS AND METHODS FOR DETERMINING A PREDICTED VEHICLE BRAKING OPERATION

CROSS-REFERENCE TO RELATED APPLICATIONS

This application claims the benefit of U.S. Provisional Application No. 60/848,534, filed Oct. 2, 2006, the entire disclosure of which is hereby incorporated herein by reference.

FIELD OF THE INVENTION

The present invention relates to an apparatus and methods and, more particularly, to methods and apparatus for determining a predicted vehicle braking operation.

BACKGROUND OF THE INVENTION

Aviation is an inherently risky mode of travel. Unlike other modes of transportation such as by land or sea where dangerous weather conditions can be avoided by "waiting out the storm", an aircraft carries a finite amount of fuel to power its engines, and must land at a suitable airport before it runs out of fuel. In addition, the great distances that an aircraft can travel in a relatively short period of time allow for drastically different landing conditions from takeoff. In today's society where time is a valuable asset, pilots often feel pressured to land their aircraft in weather conditions they previously would have avoided. In order to remain safe, pilots must be provided with very accurate information regarding current runway conditions in order to predict aircraft performance in those conditions.

Most pilots currently rely on information provided by another pilot who has recently landed for a description of the runway conditions. However, individual pilot experiences are different and reports of this kind are very subjective. For a pilot who regularly lands in winter conditions, a little snow on the runway may be perceived and reported as good landing conditions, whereas a pilot who has mostly or always landed on non snow covered runways may think that the same runway is in poor condition. The subjective nature of these observations limits their usefulness.

Another technique to provide pilots with runway characteristics is the use of a ground vehicle with a friction measurement device. Several of these devices have been conceived using different techniques to measure the current frictional characteristics. Many of these devices (for example U.S. Pat. No. 4,144,748) use a fixed slip ratio between the measurement wheels or between a measurement wheel and the vehicle wheels. This fixed slip produces a force proportional to the frictional characteristics of the surface being driven upon, and can give an indication of the condition of the runway. This measurement is difficult to interpret by an airplane pilot flying an aircraft with a different slip ratio antiskid system, and thus has limited applicability to assist the pilot in safely landing their aircraft.

Other devices such as U.S. Pat. Nos. 4,958,512, 5,814,718 and 6,711,935 use variable braking of the measurement wheel in an attempt to locate the peak frictional coefficient for the current runway conditions. In U.S. Pat. No. 4,958,512, the frictional measurement device can be set up to "seek out" the slip factor which will provide the maximal runway friction, and measure the magnitude of that force. Alternately, this invention can be set up to measure the friction at a given fixed slip ratio anywhere from 0 to 100% slip. While this would be beneficial to a braking system which incorporated this idea, it is of limited use to current aircraft braking systems as they do not have the capabilities to alter their braking algorithm.

All of the previous art has been invented in an attempt to most accurately measure the coefficient of friction of the runway or other paved surface. Although this may be helpful in determining how an aircraft will perform on landing, it will still not give the pilot a true picture of how their aircraft will perform on that surface. What is required is a device that more accurately mimics the stopping characteristics of an aircraft, so that more accurate calculations of stopping distances can be made by a pilot landing or taking off on a runway covered in snow, ice, or some other contaminant. With this device, a pilot will have a reasonable idea of how their aircraft will stop on that runway.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, an apparatus for determining a predicted vehicle braking operation is provided. The apparatus includes a test tire, a brake associated with the test tire, and an actuator operably connected to the test tire and configured to selectively apply a representative vehicle force to the test tire. The apparatus further includes a controller operably connected to the brake and configured to apply a representative vehicle braking algorithm to the brake. The apparatus also includes a sensor associated with the test tire and configured to provide feedback for determining a predicted vehicle braking operation.

In accordance with another aspect of the present invention, an apparatus for determining a predicted aircraft braking operation is provided. The apparatus includes a test tire, a brake associated with the test tire, and an actuator operably connected to the test tire and configured to selectively apply a representative aircraft braking force to the test tire. The apparatus further includes a controller operably connected to the brake and configured to apply a representative aircraft braking algorithm to the brake. The apparatus further includes a sensor associated with the test tire and configured to provide feedback for determining a predicted aircraft braking operation.

In accordance with yet another aspect of the present invention, a method is provided for using an apparatus including a test tire, a brake associated with the test tire, an actuator connected to the test tire, a controller, and a sensor associated with the test tire. The method includes the step of applying a representative braking force to the test tire with the actuator to create a representative braking characteristic. The method further includes the steps of using the controller to actuate the brake with a representative vehicle braking algorithm, providing feedback to the controller with the sensor associated with the test tire, and determining a predicted vehicle braking operation with the feedback from the sensor.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 3 is a side view of the apparatus of FIG. 1;

FIG. 6 is a side view of the example apparatus of FIG. 5 with a test tire in contact with the support surface.

DESCRIPTION OF EXAMPLE EMBODIMENTS

Figure 1:
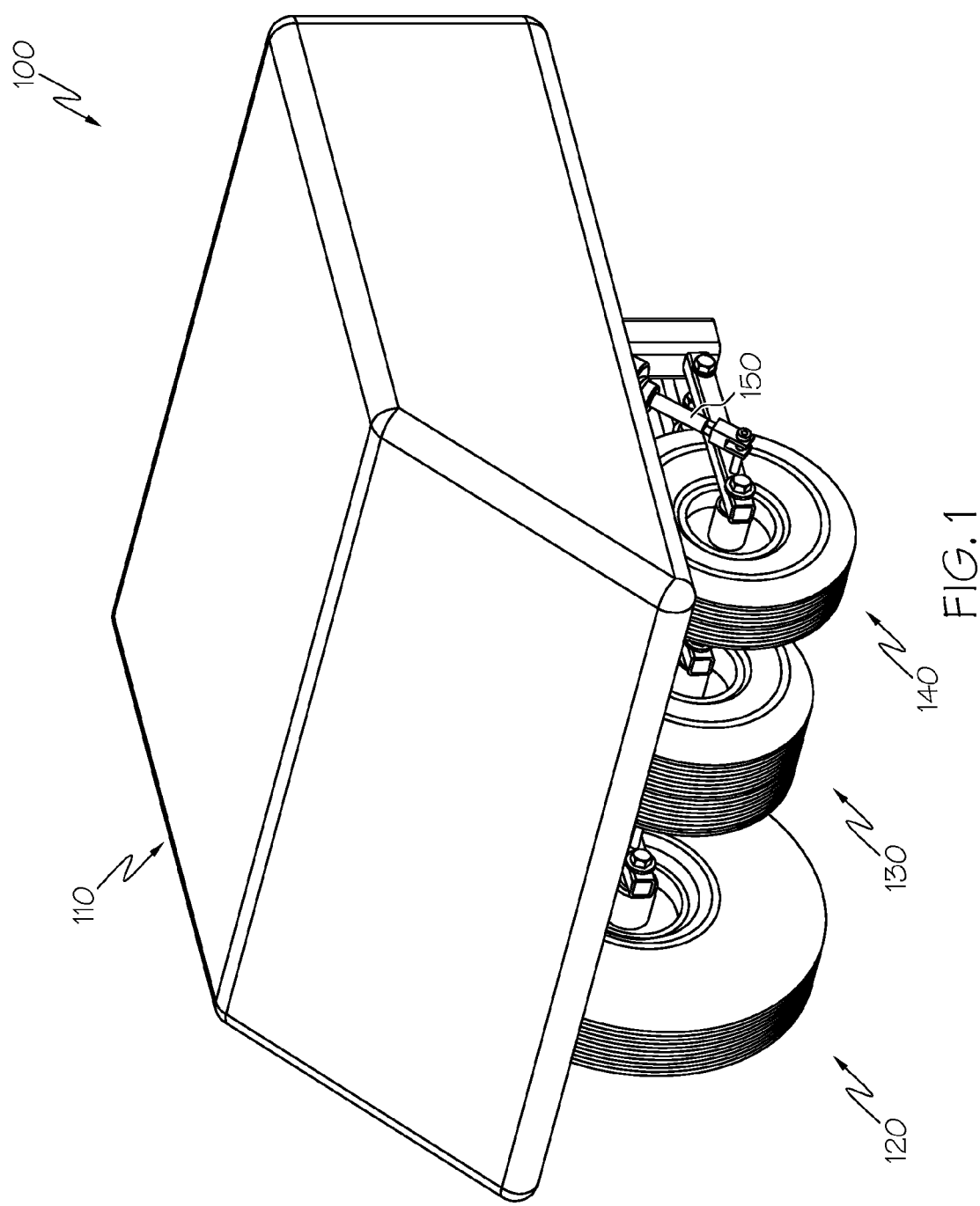
FIG. 1 is a perspective view of an example apparatus for measuring a braking force.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The present invention provides apparatus and methods for determining support surface conditions to permit a vehicle operator to better relate how a vehicle braking system will perform during a braking operation. The present invention can relate to aircraft wherein the braking operation comprises a landing operation, take off operation or an aborted take off operation on an aircraft runway. In further examples, the present invention can relate to an automobile wherein the braking operation comprising a braking procedure on a road surface. It will be appreciated that the concepts of the present invention may be used to determine how other vehicle braking systems will perform during other braking operations.

Unlike other devices used to measure the frictional characteristics of a support surface, such as a road surface, runway surface or the like, the present invention is less concerned with the measurement of the frictional characteristics of the support surface, and more concerned with measuring braking characteristics and providing vehicle operators (e.g., pilots, automobile operators) with an indication of how the vehicle will perform during a braking operation. FIG. 1 illustrates one example of an apparatus 100 that is provided for determining a predicted vehicle braking operation, such as an aircraft landing operation. The apparatus 100 can include a housing 110 and one or more test tires. For instance, the apparatus 100 illustrates a first test tire 120, a second test tire 130, and a third test tire 140. It will be appreciated that an apparatus can include one, two, or any number of test tires in further examples. The apparatus 100 can be covered by the housing 110 to reduce the effects of the environment on its operation. The housing 110 can include the electronic and/or mechanical controls for running and/or propelling the apparatus 100. These controls can include, but are not limited to, controls to raise and lower the test tires 120, 130, 140, anti-skid controls, etc.

In the example of FIG. 1, each test tire 120, 130 and 140 can be actual vehicle tires (e.g., aircraft tires, automobile tires, etc.) although other representative tires can be provided in further examples. Moreover, the tires may have the same or different characteristics. For instance, as shown, each test tire 120, 130, 140 includes a different diameter/width corresponding to different vehicle tires. It should be noted that in no way is this invention limited to three test tires. As few as one and as many as ten or more different test tires could be utilized on the apparatus. In another example, the test tires 120, 130, 140 could be representative of aircraft tire types which are landing at an airport. Therefore, larger airports with many different aircraft types may require a multitude of tires to be included on the apparatus to provide accurate measurement for each of the different aircraft types. Alternatively, at a smaller airport where most of the aircraft are of similar size and type may be able to utilize a device with only a single test tire for measurement.

Figure 2:
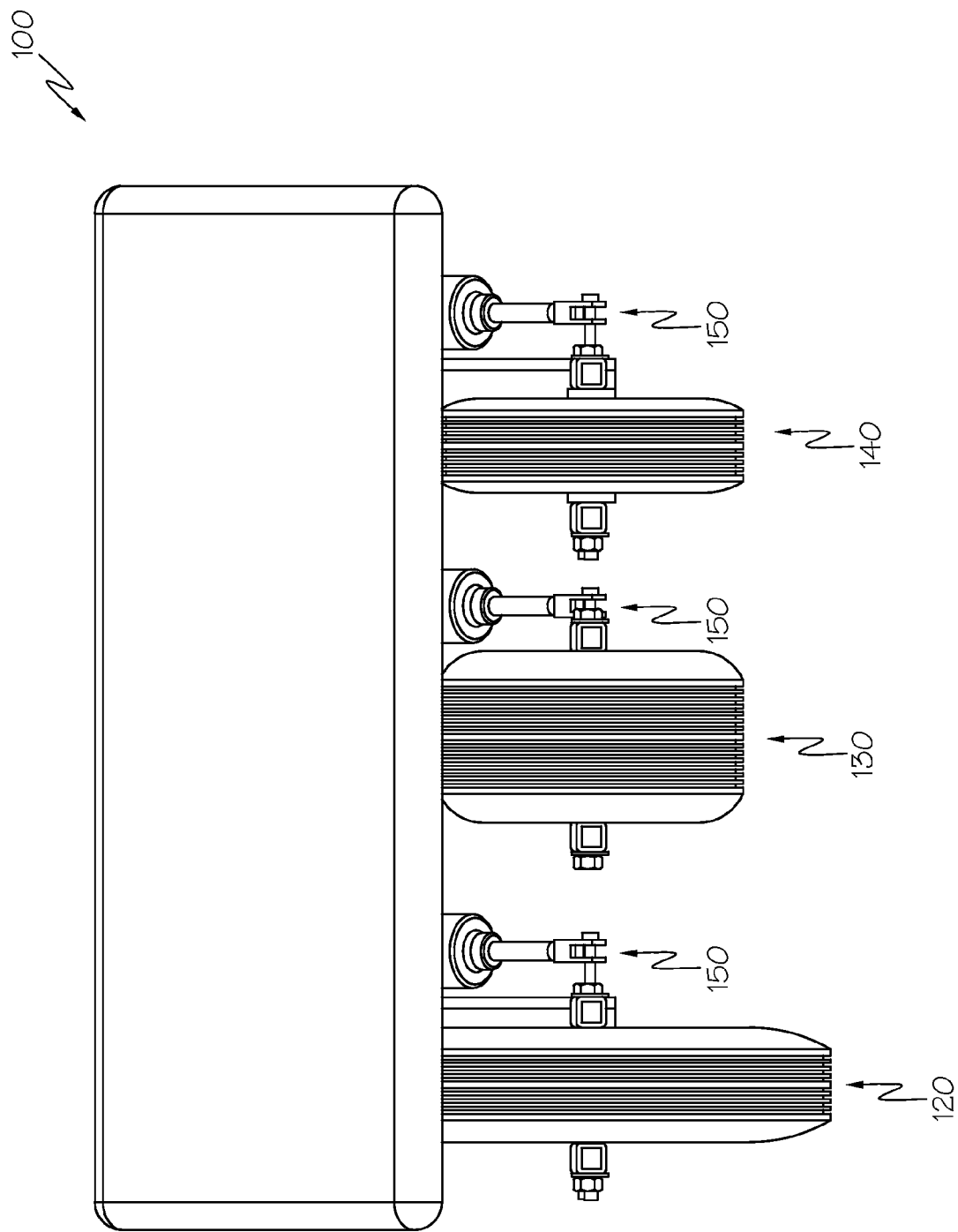
FIG. 2 is a front view of the apparatus of FIG. 1.

FIG. 2 is a front view of one example of the present invention. Test tires 120, 130 and 140 are again visible, and it is easier to see the different dimensions of these tires. In this example, the apparatus 100 further includes at least one actuator 150. The at least one actuator 150 is used to raise and lower one or more of the test tires 120, 130, 140 to the support surface. In one example, the actuator 150 can be configured to apply a representative vehicle braking force to each test tire 120, 130, 140 that is a representative braking characteristic, such as a load from an actual vehicle. In one example, the force applied to the test tire 120, 130, 140 can be representative of the loading of an actual aircraft tire on an actual aircraft during a landing, take off or aborted take off operation. The representative aircraft braking force can comprise an actual landing force or a modified landing force depending on the test tire characteristics. For instance, an actual landing force can be used with a test tire comprising an actual aircraft tire. In other examples, a reduced representative force can be used with a scaled down version of the aircraft tire. A reduced representative force and scaled down versions of other vehicle forces can be provided in further examples. Providing a scaled down version can reduce the cost and force necessary to provide an accurate braking simulation.

In another example, the actuator 150 can be configured to apply a representative vehicle force to each test tire 120, 130, 140 that creates a representative vehicle force characteristic. The representative vehicle force can comprise a force representative of the loading of a vehicle during a braking of the vehicle, a turning maneuver, or combination braking and turning maneuver. The representative vehicle force can also be used with a scaled down version of a vehicle tire.

Figure 4A:
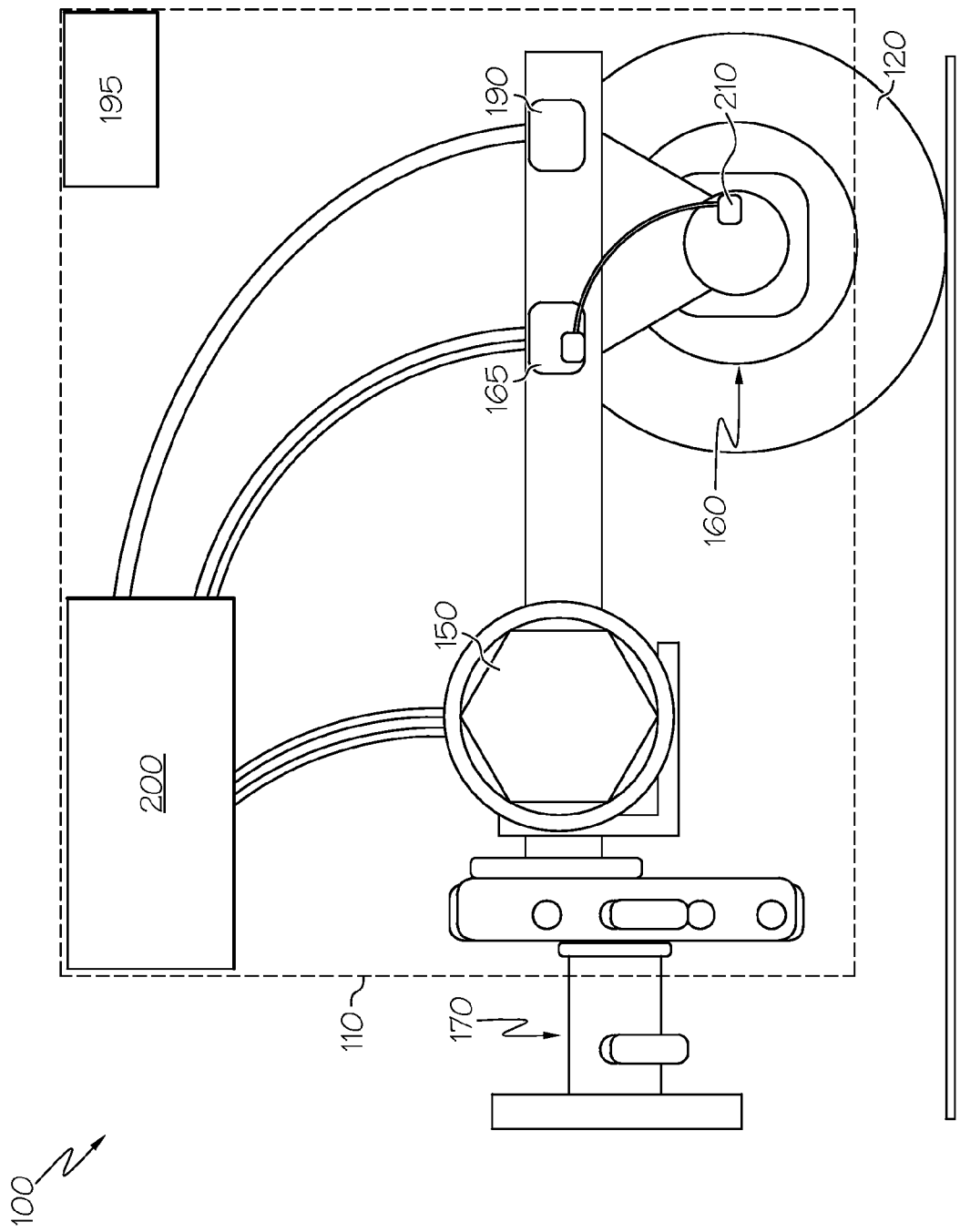
FIG. 4A is schematic view of interior components of the apparatus of FIG. 1.

As shown, each test tire includes a corresponding actuator 150 configured to permit individual actuation of each test tire alone or in combination with other test tires. It is also possible that one actuator may actuate two or more of the test tires in further examples. In further examples the actuators can be used to lift the test tire out of contact with the support surface and/or provide a representative force to the test tire. In further examples, the test tires 120, 130, 140 can be provided in continuous contact with the support surface and the actuators 150 can be used purely to apply a load to these test tires. The actuator 150 can be used both to apply the loading to the test tire 120, 130, 140, as well as to raise the test tire 120, 130, 140 from the support surface when not in use. As seen in FIG. 4A, the actuator 150 can be a rotary hydraulic actuator in one example.

In still another example, the actuators 150 can include a set of counterweights configured to be moved forward and backward of the test tires to apply a representative loading for the test tires. In another example including a set of counterweights, a smaller counter weight could be mounted at a larger distance away from the apparatus 100 for leverage. In this way, the desired reaction force induced in the tire by this counter weight could more easily produce the required representative loading for the test tire without requiring the heavier weights that are more difficult to handle.

FIG. 3 shows a side view of one embodiment of the present invention. In this example, a brake 160 is associated with each test tire. For example, as shown, the set of brakes 160 are attached to the hub of each test tire 120, 130, 140. The location of the brake 160 in FIG. 3 is only one example of its location. The brakes 160 can be controlled by way of electronics, such as a controller 200, contained within the housing 110. As seen in FIG. 4A, the controller 200 can be located within the housing 110 although the controller can be located outside of the housing in further examples. The controller 200 can be placed in operable connection to each brake 160, such as through a brake controller 165. The controller can be configured to apply a representative vehicle braking algorithm to the brake. Due to different manufacturers and ages of vehicles in use, the representative vehicle braking algorithm of each vehicle type can be significantly different. For this reason, the controller 200 is configured to apply at least one representative vehicle braking algorithm to each brake 160. In one example, the controller 200 can include the same algorithms as the aircraft types which are expected to land at an airport or the vehicles that are desired to be tested, and can be updated at any time with different control algorithms. Updating the controller 200 can be done by conventional means such as wirelessly or through a direct wired connection.

In one example, the representative vehicle braking algorithm can be modified to vary a slip ratio between the test tire and a support surface in a range from 0% to 100% to obtain an optimized slip ratio. Such examples can include use with various vehicles such as an automobile, aircraft, or the like. The optimized slip ratio may be used by the controller to modify a predetermined braking algorithm to include the optimum slip ratio to optimize the braking operation. In one example, the optimized slip ratio can be determined based on feedback sent to the controller. In further examples, the optimized slip ratio can be manually determined, or dialed in, by the operator. Thus, the operator of the vehicle may select from a variety of alternative slip ratios to determine the best stopping performance under the current available braking conditions.

In another example, the test tires 120, 130, 140 can be of varying sizes or types from the actual vehicle tires. For example, the contact patch size of a vehicle tire as well as its loading can be stored in the controller 200. The size and loading would then be scaled down to obtain the size and loading for a relative contact patch area for a smaller test tire 120, 130, 140. Dimensional analysis ensures that the forces measured can easily be translated into the resulting forces on the actual vehicle tire. The test tire 120, 130, 140 need not be an actual vehicle tire, but could be a tire exhibiting similar characteristics to a vehicle tire.

One example method of using the apparatus will now be described with respect to an aircraft braking operation although other vehicle braking operations are possible for other types of vehicles. Aircraft braking operations can include, for example, an aircraft landing operation, a take off operation, an aborted take off operation, or the like. When using the apparatus 100 to determine a predicted aircraft braking operation, the apparatus 100 can be propelled down the support surface (e.g., a runway), with one or several of the test tires 120, 130, 140 in contact with the support surface. As the apparatus 100 moves, the actuator 150 applies the appropriate loading to the test tires in contact with the surface, and then the controller 200 applies the representative aircraft braking algorithm to each brake 160 to carry out a set of tests in actuating the brakes 160 of each of the test tires. The brakes 160 are applied using the representative aircraft braking algorithm for a particular aircraft, and the maximum attainable torque can be measured on the wheel hub using at least one sensor 210. Each sensor 210 is associated with each test tire 120, 130, 140 and is configured to provide feedback for determining a predicted aircraft braking operation. The feedback can be based on the measured part of the support surface. A few cycles of the aircraft braking algorithm may be all that is required to obtain the required measurements to provide feedback. The controller could then select another anti-skid control algorithm from another aircraft and complete a similar measurement using this control algorithm. The sensor 210 can include a force-measuring cell or load cell to measure both a vertical force, such as the load force, and a longitudinal force, such as the braking force on the test tire 120, 130, 140. The braking force induced by the test tire 120, 130, 140 when the braking system is activated can be measured in a number of ways such as by a load cell arrangement in a structural member, a sensor located directly at the hub of the test tire 120, 130, 140 using a bearing with an integral load cell, or by using a bearing mounted on a load sensing plate.

In yet another example, the apparatus 100 can include a vibrating mechanism 195 to remove the built-up debris, such as snow, that may otherwise accumulate on the apparatus 100 or on the housing 110 of the apparatus 100. The vibrating mechanism 195 can be included within a housing 110 of the apparatus 100 or can be included on the exterior of the housing 110.

Since each anti-skid cycle of a representative vehicle braking algorithm may only take fractions of a second, many different control algorithms could be measured as the apparatus 100 moves down the support surface. The apparatus 100 can cycle through each of the control algorithms in turn, and each time it can measure the maximum attainable torque at the test tire hub. Alternately, instead of measuring the torque for each wheel during the braking maneuver, the force induced in a structural member attached between the appropriate test tire 120, 130, 140 and the housing 110 could be measured with another sensor 210, such as a load cell.

Following each measurement, the controller 200 can convert the measured force or torque into the appropriate braking force available for each particular vehicle to which the vehicle braking algorithm applied. The available braking force could be averaged over the length of the support surface, or alternately, could be used to show the different braking forces available along the length of the support surface.

Figure 5:
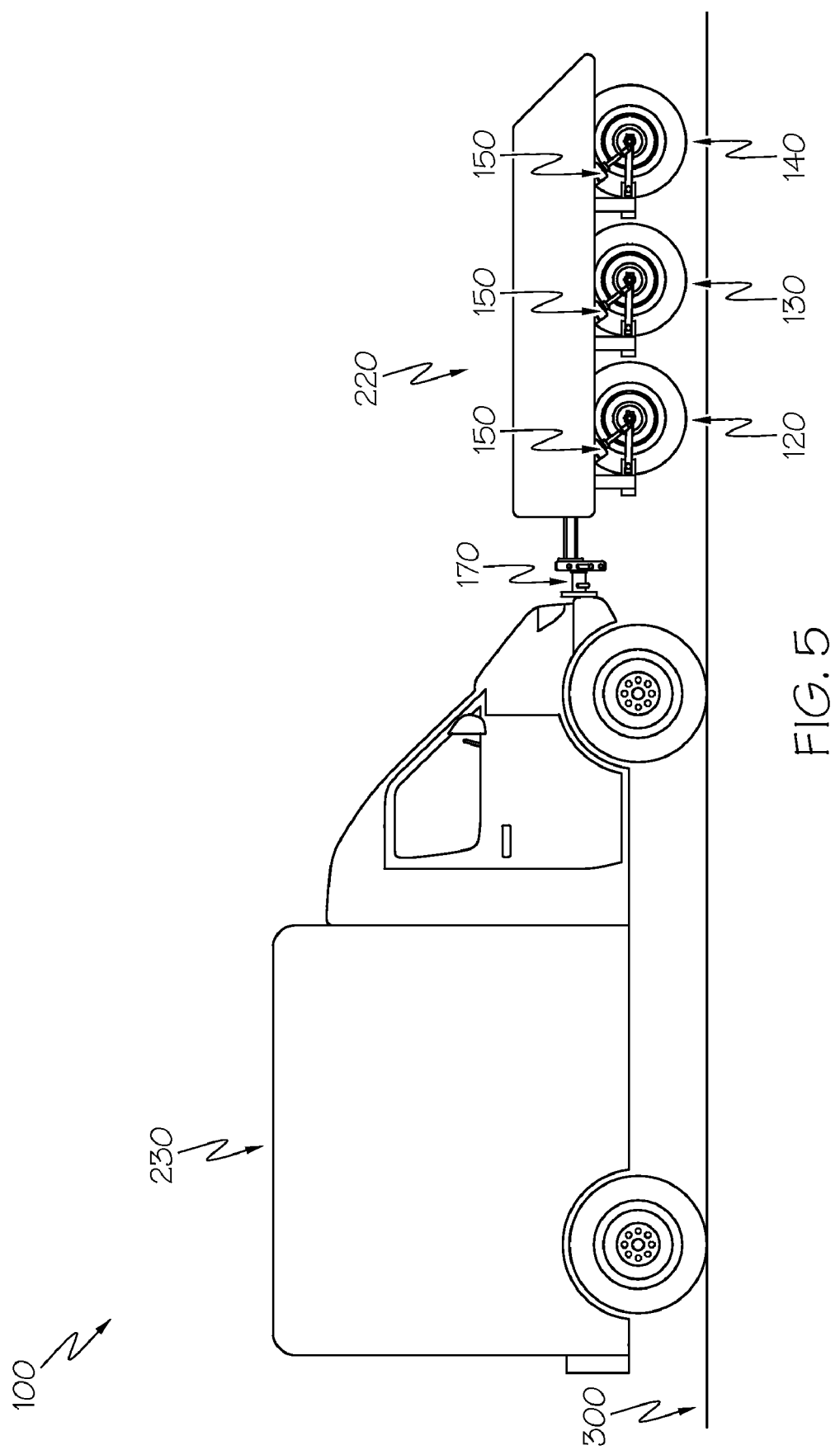
FIG. 5 is a side view of an example apparatus including a vehicle and a measuring device with test tires out of contact with a support surface.

In one example of the apparatus 100, there are no additional tires or wheels aside from the test tires 120, 130, 140 to support the apparatus 100 on the ground. The apparatus 100 can further include a measurement device 220, as seen in FIG. 5. The measurement device 220 can include the test tire 120, 130, 140, the brake 160 associated with each test tire 120, 130, 140, and the actuator 150 operably connected to each test tire 120, 130, 140. In further examples, the measurement device 220 can further include the controller 200 and the sensor 210. As shown in FIGS. 5 and 6, the measurement device 220 can be used with a vehicle 230 configured to propel the measurement device 220. The vehicle 230 seen in FIG. 5 and FIG. 6 is by example only and other types and styles of vehicles can also be used. In one example, the measurement device 220 can be mounted in front of the vehicle 230 and the vehicle 230 pushes the measurement device 220 ahead of the vehicle 230 on a path. In this way, all measurements with the measurement device 220 are made before the vehicle 230 passes over the support surface, minimizing the affect of the vehicle 230 on the readings. It should be noted, however, that the measurement device 220 can also be towed behind, pushed beside, or be integral with the vehicle 230 without diverging from the scope of the present invention.

A hitch attachment 170 can be used to mount the measurement device 220 onto the other vehicle 230. In the example of FIG. 3, the hitch attachment 170 protrudes out the rear of the apparatus 100. The hitch attachment 170 can be used to mount the present invention on any other vehicle 230 such as an airport inspection vehicle, through the use of a hitch attachment such as a Reese hitch. In the example of FIG. 4A, the hitch attachment 170 protrudes out of one side of the apparatus 100.

As illustrated in FIGS. 5 and 6, the hitch attachment 170 can permit the vehicle 230 to support the entire weight of the measurement device 220. It is also possible for the measurement device 220 to include one or more support wheels to help support the weight of the measurement device. Still further, the measurement device 220 may include support wheels and may be designed to be self propelled wherein the apparatus includes a measurement device and vehicle that are integrally provided. FIG. 6 shows one of the test tires 120 from FIG. 5 being lowered by an actuator 150 to engage a support surface 300. It is appreciated that more than one test tire 120, 130, 140 can be lowered at one time and that different arrangements of the test tires can be used.

Figure 4B:
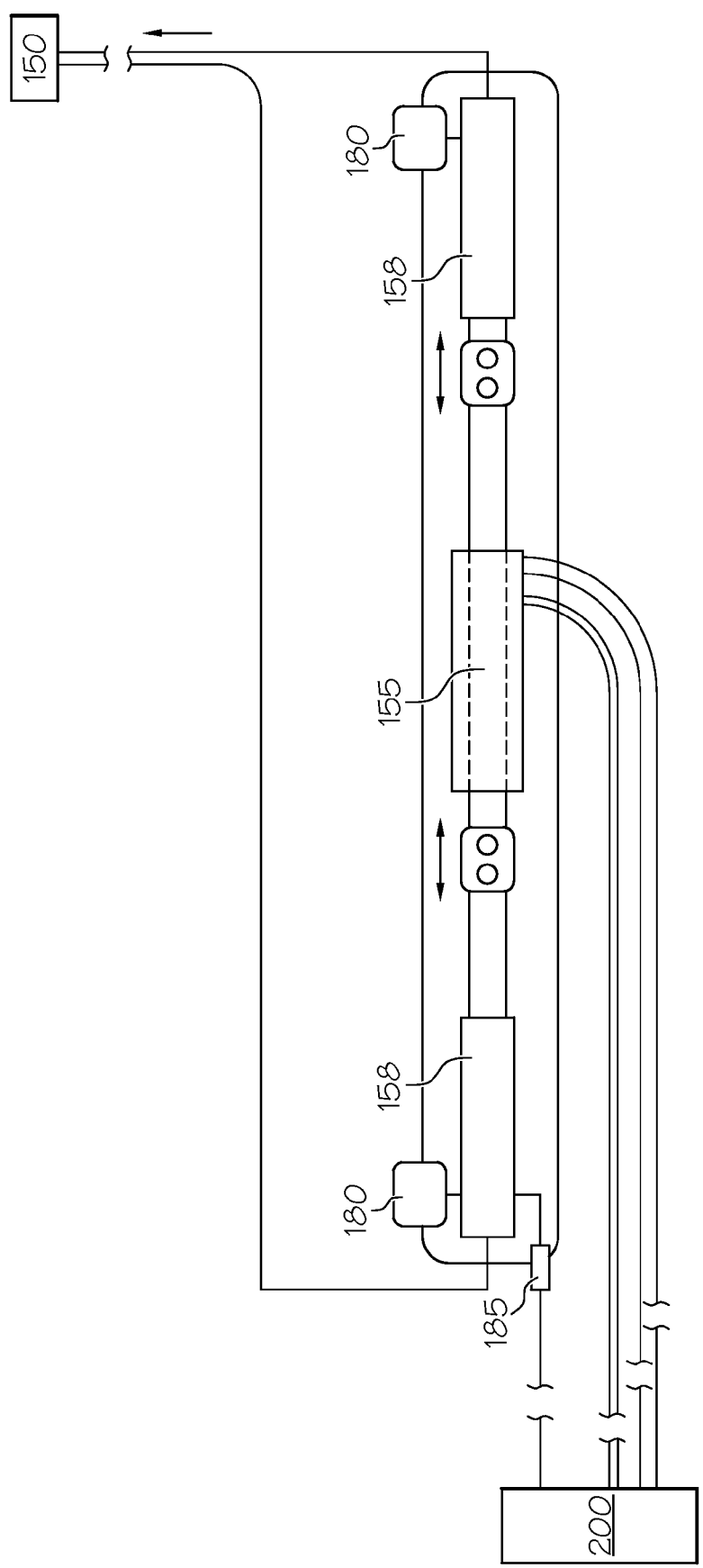
FIG. 4B is a schematic view of further components of the apparatus of FIG. 1.

In another example, at least one of the actuators 150 can include an accumulator 180, as seen in FIG. 4B, that is configured to allow each test tire 120, 130, 140 to follow an uneven support surface or undulating support surface profile. The accumulator 180 allows the test tire 120, 130, 140 to follow the undulating support surface profile and maintain a relatively consistent pressure. The accumulator 180 is also provided with an electric actuator 155 that is configured to push/pull a hydraulic cylinder 158 to provide the force required to lift the test tire 120, 130, 140 or apply a specific and controllable loading to the test tire 120, 130, 140. By using a regenerative circuit on the down pressure hydraulic cylinder, the force required by the actuator could be reduced to make the design more practical. In a further example, at least one of the accumulators 180 also includes a pressure sensor 185 that is configured to measure a hydraulic pressure exerted on the accumulator 180. The pressure sensor 185 can be operatively connected to the controller 200 and the controller 200 uses the pressure sensor 185 along with the sensors 210 to determine the actual load on the test tires 120, 130, 140 despite the uneven support surface. Thus, the controller 200 is configured to use the hydraulic pressure measured by at least one pressure sensor 185 as an additional variable in determining the predicted vehicle braking operation.

In another example, seen in FIG. 4A, a lateral sensor 190 can be included to measure a mean lateral G-force, where the lateral force indicates a turning maneuver of the apparatus 100. The lateral sensor 190 is operatively connected to the controller 200. In response to a turning maneuver generating a threshold G-force, the lateral sensor 190 can send a signal to the controller 200 to actuate the accumulator 180 to raise the test tire off the support surface. Raising the test tires in response to a significant turning maneuver can prevent damage due to undesirable turning forces that would otherwise act against the apparatus. The lateral sensor 190 can be provided with a low frequency filter so that high frequency vibrations from normal vehicle operating conditions would not be transmitted to the sensors associated with the test tires.

The available braking force and other feedback from the apparatus 100 can be presented to the operator of a vehicle. In one example, such feedback can be provided to the pilot of an aircraft, driver of an automobile, or the like. The controller 200 of the vehicle can use the predicted braking force provided by the test tires 120, 130, 140 of the apparatus 100 for a number of outputs. For example, the predicted braking force can be used to calculate the projected stopping distance for the vehicle, such as an aircraft. The projected stopping distance can be used to see if it is safe to land the aircraft to determine an expectation for controllability of the aircraft during a landing operation, to warn a pilot when the measured support surface friction is too low to permit a safe landing with the current crosswinds, or to advise a pilot of the distance required to stop in the event of an aborted take off.

Another aspect of the present invention is the ability to provide continuous monitoring of the apparatus 100 and the vehicle systems. The feedback for determining a predicted vehicle braking operation can be used by the controller 200 to calculate the predicted effective braking coefficient for a particular vehicle braking system. Thus, in one example method for measuring a braking force for at least one type of vehicle on a support surface, the method includes at least one test tire 120, 130, 140, a brake 160 associated with each test tire 120, 130, 140, at least one actuator 150 connected to each test tire 120, 130, 140, a controller 200 operably connected to each brake 160, and at least one sensor 210 is associated with each test tire 120, 130, 140. This example method includes the steps of using at least one of the actuators 150 to apply a representative braking force to a selected one of the test tires 120, 130, 140 to create a representative braking characteristic, using the controller 200 to actuate the brake 160 with a representative vehicle braking algorithm providing feedback to the controller 200 with the sensor 210, and determining a predicted vehicle braking operation with the feedback from the sensor 210.

A further aspect of the present invention is the ability to provide continuous monitoring of the apparatus 100 and the vehicle system. The feedback for determining a predicted vehicle braking operation can be used by the controller 200 to calculate the predicted effective braking coefficient for a particular vehicle braking system. Thus, in one example method for measuring a braking force for at least one type of vehicle on a support surface, the method includes at least one test tire 120, 130, 140, a brake 160 associated with each test tire 120, 130, 140, at least one actuator 150 connected to each test tire 120, 130, 140, a controller 200 operably connected to each brake 160, and at least one sensor 210 is associated with each test tire 120, 130, 140. This example method includes the steps of using at least one of the actuators 150 to apply a representative vehicle force to a selected one of the test tires 120, 130, 140 to create a representative vehicle force characteristic, using the controller 200 to actuate the brake 160 with a representative vehicle braking algorithm providing feedback to the controller 200 with the sensor 210, and determining a predicted vehicle braking operation with the feedback from the sensor 210.

In another example, the method can also include the step of using the controller 200 to calculate a required stopping distance for a selected type of vehicle associated with a selected test tire 120, 130, 140. In another example, the method can further include the step of providing the controller 200 with a plurality of vehicle braking algorithms corresponding to different types of vehicles, such as aircrafts. In yet another example, the method can further include the step of raising at least one of the test tires 120, 130, 140 off of the support surface in response to a turning maneuver.

In a different example, the method further includes the step of using the sensor 210 to measure a predicted force needed to stop a type of vehicle, such as an aircraft, associated with the selected tire. This example can further include the steps of determining an actual braking force experienced by an aircraft braking system of an actual aircraft, and comparing the predicted braking force with the actual braking force experienced by the actual aircraft. If the predicted effective braking coefficient or force is different, or much higher, when compared to the actual braking coefficient or force experienced by the actual aircraft, an alarm can be triggered for a pilot of the actual aircraft in response to the difference between the actual braking force and the predicted braking force. In another example, the controller can trigger the alarm when the difference includes a range of differences, such as a percentage, between the predicted and actual coefficients or forces. If the pilot had commanded maximum autobrakes, but the actual effective braking coefficient was different, or much lower, than the predicted braking coefficient using the apparatus 100, a maintenance signal can be triggered to indicate that the actual aircraft braking system requires further attention. If the subsequent aircraft also produced different actual braking forces than the predicted values using the apparatus 100, a signal could be generated indicated a possible apparatus malfunction.

In another example, the method further includes the step of determining whether to treat a surface of a runway based on information from the predicted vehicle braking operation. In this method, maintenance personnel can be contacted or signaled if the predicted vehicle braking operation is at a certain threshold or is showing that a vehicle may not be able to stop properly without snow removal, etc. In another example of this method, the predicted vehicle braking operation can be compared with subsequent predicted vehicle braking operation from subsequent measurements to determine when the surface of the runway should be treated. In such an example, the apparatus can be used to repeat a testing procedure over a period of time to determine a plurality of successive predicted vehicle braking operations. Such predicted vehicle braking operations can include information regarding the predicted braking forces, braking distances required for a successful braking operation, or other information. These successive predicted vehicle braking operations can be compared. For example, the predicted braking forces or the required braking distances can be compared from successive test procedures. A maintenance signal can then be triggered in response to a comparison between successive predicted vehicle braking operations. For example, a difference between the successive predicted vehicle braking operations can indicate that the predicted braking performance is deteriorating quickly or below a threshold. Such changes in braking performance can trigger a signal to maintenance personnel to rectify the deteriorating braking performance.

In addition to monitoring of the vehicle and braking action measurement systems, the apparatus could be used by support surface maintenance crews on the airfield to monitor the conditions of their support surface. Short term monitoring of the predicted braking coefficients using the apparatus could show a deteriorating trend in the stopping characteristics of aircraft, such as increased braking distances or decreased effective braking coefficients, which may require application of chemicals or mechanical removal of contaminants such as snow and ice. In addition, the present invention could be used to monitor the condition of the support surface for braking of a particular aircraft, such as a large Boeing 787 or Airbus A-380, which would require the longest braking distance.

An appropriate margin of error could be set so that removal of contaminants from the support surface would not be required until the largest expected aircraft could not stop without a 20% margin of error, for example. In this way, maintenance personnel could use the apparatus to assist in support surface maintenance decisions, and reduce the needless time and expense of clearing a support surface, such as a runway, which is still adequate for controlling an aircraft. Longer term monitoring of the predicted braking coefficients could show deterioration of the pavement surface from wear, or from contaminant such as rubber left behind from aircraft tires. Thus, for long term trend monitoring, the present device can reveal conditions experienced by the aircraft. If the runway surface is determined to be deteriorating (e.g., due to rubber buildup), the predicted braking distances would successively increase during each subsequent test with the apparatus. The increasing braking distances would indicate a deteriorating condition of the pavement, thereby providing notice to the maintenance personnel that the support surface should be improved.

In another example method for using the apparatus, the method further includes the step of using the predicted vehicle braking operation to reconstruct a scene of an accident. For example, the apparatus 100 can be used to determine the amount of braking force that would need to be applied for a vehicle to lose control. Alternatively, the apparatus can reconstruct an accident to determine the amount of slip ratio and braking force that could be supplied by a certain type of vehicle. In another example the apparatus can determine the braking force available to a particular vehicle. The available braking force can then be used to determine speeds or other parameters which would help to reconstruct the accident scene.

In another example method for using the apparatus, the method further includes the step of using the predicted vehicle braking operation to modify an actual vehicle braking algorithm. For example, the actual vehicle braking algorithm can be modified based on any of the tests that are performed by the apparatus 100 to provide optimum performance for the actual vehicle. The apparatus is used in this manner to improve the actual braking algorithm for any vehicle type or can be used to improve the algorithm for specific support surface conditions or different support surfaces.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An apparatus for mimicking a braking operation for a selected vehicle and determining a predicted vehicle braking operation for the selected vehicle comprising:
   a test tire;
   a brake operably connected with the test tire and configured to apply a braking force to the test tire;
   an actuator operably connected to the test tire and configured to selectively apply a representative vertical vehicle loading to the test tire corresponding to the selected vehicle;
   a controller operably connected to the brake and configured to apply a representative vehicle braking algorithm to the brake wherein the representative vehicle braking algorithm corresponds to the selected vehicle; and
   a sensor operably connected with the test tire and configured to provide feedback to the controller for determining the predicted vehicle braking operation for the selected vehicle.

2. The apparatus according to claim 1, wherein the actuator includes an accumulator configured to allow the test tire to follow an uneven support surface.

3. The apparatus according to claim 2, wherein the accumulator includes a pressure sensor configured to measure a hydraulic pressure exerted on the accumulator.

4. The apparatus according to claim 3, wherein the controller is configured to use the hydraulic pressure measured by the pressure sensor as an additional variable in determining the predicted vehicle braking operation for the selected vehicle.

5. The apparatus according to claim 2, further comprising a lateral sensor configured to sense a turning maneuver and to send a signal to the controller to actuate the accumulator to raise the test tire off a support surface.

6. The apparatus according to claim 1, further comprising a measurement device including the test tire, the brake and the actuator, and further comprising a vehicle configured to propel the measurement device.

7. The apparatus according to claim 6, further comprising a hitch configured to mount the measurement device to the vehicle.

8. The apparatus according to claim 6, wherein the vehicle supports the entire weight of the measurement device.

9. The apparatus according to claim 1, further comprising a vibrating mechanism configured to remove debris from the apparatus.

10. An apparatus for mimicking a braking operation for a selected aircraft and determining a predicted aircraft braking operation for the selected aircraft comprising:
    a test tire;
    a brake operably connected with the test tire and configured to apply a braking force to the test tire;
    an actuator operably connected to the test tire and configured to selectively apply a representative vertical vehicle loading to the test tire corresponding to the selected aircraft;
    a controller operably connected to the brake and configured to apply a representative aircraft braking algorithm to the brake wherein the representative vehicle braking algorithm corresponds to the selected aircraft; and
    a sensor operably connected with the test tire and configured to provide feedback to the controller for determining the predicted aircraft braking operation for the selected aircraft.

11. A method for mimicking a braking operation for a selected vehicle using an apparatus including a test tire, a brake operably connected with the test tire and configured to apply a braking force to the test tire, an actuator connected to the test tire, a controller, and a sensor operably connected with the test tire, the method comprising the steps of:
    applying a representative braking force corresponding to the selected vehicle to the test tire with the actuator to create a representative braking characteristic;
    using the controller to actuate the brake with a representative vehicle braking algorithm corresponding to the selected vehicle;
    providing feedback to the controller with the sensor operably connected with the test tire; and
    determining a predicted vehicle braking operation for the selected vehicle with the feedback from the sensor.

12. The method according to claim 11, further comprising the step of calculating a required stopping distance for the selected vehicle associated with the test tire with the controller.

13. The method according to claim 11, further comprising the step of providing the controller with a plurality of vehicle braking algorithms corresponding to different selected vehicles.

14. The method according to claim 11, further comprising the step of raising the test tire off of a support surface in response to a turning maneuver.

15. The method according to claim 11, further comprising the step of using the representative vehicle braking algorithm to vary a slip ratio between the test tire and a support surface in a range from 0% to 100%.

16. The method according to claim 11, further comprising the step of determining whether to treat a support surface based on information from the predicted vehicle braking operation.

17. The method according to claim 11, further comprising the step of using the predicted vehicle braking operation to reconstruct a scene of an accident.

18. The method according to claim 11, further comprising the step of using the predicted vehicle braking operation for the selected vehicle to modify an actual vehicle braking algorithm.

19. The method according to claim 11, further comprising the step using the sensor to measure a predicted force to stop the selected vehicle, where the selected vehicle is a type of aircraft.

20. The method according to claim 19, further comprising the steps of:
    determining an actual braking force experienced by an aircraft braking system of an actual aircraft;
    comparing the predicted braking force with the actual braking force experienced by the actual aircraft; and
    triggering an alarm for a pilot of the actual aircraft in response to a difference between the actual braking force and the predicted braking force.

21. The method according to claim 19, further comprising the steps of:
    determining an actual braking force experienced by an aircraft braking system of an actual aircraft;
    comparing the predicted braking force with the actual braking force experienced by the actual aircraft; and
    triggering a maintenance signal for the actual aircraft in response to a difference between the actual braking force and the predicted braking force.

22. The method according to claim 11, further comprising the steps of:
    repeating a testing procedure with the apparatus over a period of time to determine a plurality of successive predicted vehicle braking operations;
    comparing the successive predicted vehicle braking operations; and
    triggering a maintenance signal in response to a comparison between successive predicted vehicle braking operations.

* * * * *